United States Patent [19]

Nara et al.

[11] 4,310,419
[45] Jan. 12, 1982

[54] FILTER ELEMENT FOR LIQUID STRAINING FILTER

[75] Inventors: Akio Nara; Hideaki Sasaya, both of Okazaki, Japan

[73] Assignee: Nippon Soken, Inc., Nishio, Japan

[21] Appl. No.: 229,629

[22] Filed: Jan. 29, 1981

[30] Foreign Application Priority Data

Mar. 19, 1980 [JP] Japan .................. 55-35432

[51] Int. Cl.³ .............................. B01D 29/06
[52] U.S. Cl. ...................... 210/493.4; 210/493.5; 210/497.1; 210/497.2; 55/520; 55/521
[58] Field of Search ............. 210/321.5, 493.1, 493.2, 210/493.4, 493.5, 497.1, 497.2; 55/520, 521

[56] References Cited

U.S. PATENT DOCUMENTS

| | | | |
|---|---|---|---|
| 3,037,637 | 6/1962 | Bub | 210/493.4 |
| 3,076,554 | 2/1963 | Bub | 55/520 |
| 3,323,963 | 6/1967 | Summers | 210/493.4 |
| 3,739,916 | 6/1973 | Cub et al. | 210/497.2 |
| 4,039,457 | 8/1977 | Schacht et al. | 210/497.2 |
| 4,056,876 | 11/1977 | Lammermann | 210/493.1 |

*Primary Examiner*—Ernest G. Therkorn
*Attorney, Agent, or Firm*—Cushman, Darby & Cushman

[57] ABSTRACT

A filter element for straining liquid formed of a filter material in a convoluted form including two portions, one portion being a planar portion and the other portion being a corrugated portion having a plurality of elevated areas. The filter material is foled in half in the longitudinal center and wound in convolutions so that a series of letters V are formed on a transverse cross-sectional surface thereof. The pitch of the elevated areas is smaller in the central portion of the convoluted filter element corresponding to the end of the filter material at which winding is started and larger in the outer peripheral portion thereof.

3 Claims, 8 Drawing Figures

FILTER ELEMENT FOR LIQUID STRAINING FILTER

BACKGROUND OF THE INVENTION

1. Field of the Invention

This invention relates to a filter element for straining liquid to remove therefrom by filtration various types of foreign matter incorporated therein, which is suitable for use in a fuel filter, lubricant filter, etc., of motor vehicles, for example.

2. Description of the Prior Art

In one type of filter element for straining liquid known in the art, such as the one disclosed in U.S. Pat. No. 3,739,916, for example, the filter element has a constructional form in which filter paper is folded in half on the longitudinal center and wound in such a manner that one half portion is corrugated and the other half portion is planar.

FIG. 1 shows the essential portions of a filter element of the prior art for straining liquid, in which a corrugation W including an elevated areas and depressed areas is symmetrical with respect to the center line m. The corrugation W have bonding agent sections V of a large volume. And depressed areas at the beginning of the winding is equal to that of the elevated areas and depressed areas at the end of the winding. One of the disadvantages of the filter element of the aforesaid constructional form of the prior art is the use of a large amount of bonding agent 20 at a time the V-shaped filter paper is wound. This disadvantage is primarily attributed to the constructional form of the filter element that it is corrugated. To provide a corrugation in such a manner that the elevated areas and the depressed areas are substantially symmetrical with respect to the center line of the corrugation increases the volume of sections in which a bonding agent is stuffed. This increases the loss of pressure of the liquid flowing through the filter element, making it necessary to raise the pressure of the liquid feeding pump.

Another disadvantage, which is associated with the first disadvantage described hereinabove, is that since the sections of the filter element in which the bonding agent is stuffed have a large volume, the effective surface area of the filter paper for allowing the liquid to flow therethrough is reduced.

A still another disadvantage stems from winding of the filter paper and involves the problem that difficulties are experienced in winding the filter paper in such a manner that the pitch of the elevated areas and depressed areas of the corrugation remains constant. In particular, difficulties are encountered in winding the central portion of the filter paper which has a small radius of winding, so that the V-shape of the filter paper becomes distorted and the filter paper is difficulty wound.

SUMMARY OF THE INVENTION

This invention has been developed for the purpose of obviating the aforesaid disadvantages of the prior art. Accordingly, a first object of the invention is to provide a filter element for straining liquid wherein the pitch of the elevated areas of the corrugation of the filter element wound in convolutions is reduced in the central portion of the convoluted filter element corresponding to the end of the filter material at which winding is started and increased in the outer peripheral portion of the convoluted filter element, whereby the the amount of the bonding agent used in bonding the bent portions of the filter material together can be greatly reduced in the outer peripheral portion of the convoluted filter element.

A second object is to provide a filter element for straining liquid wherein the effective surface area of the liquid filtering section is increased by reducing the amount of the bonding agent applied to the outer peripheral portion of the convoluted filter element to thereby minimize the loss of pressure which might occur when the liquid flows through the filter element.

A third object is to provide a filter element for straining liquid wherein winding of the corrugated filter material in convolutions can be facilitated by the fact that the pitch of the elevated areas of the corrugation of the filter element wound in convolutions is reduced in the outer peripheral portion of the convoluted filter element.

In the invention, the pitch of the elevated areas of the corrugation of the filter element wound in convolutions is reduced in the central portion of the convoluted filter element which corresponds to the end of the filter material at which winding is started and increased in the outer peripheral portion of the convoluted filter element, so that the amount of the bonding agent applied to the filter element when the latter is wound can be greatly reduced in the outer peripheral portion of the convoluted filter element. The filter element according to the invention can have the surface area of its filtering section increased and have the loss of pressure occurring when the liquid flows through the filter element reduced merely by reducing the volume of the bonding sections of the filter element. Moreover, the arrangement that the pitch of the elevated areas of the corrugation of the convoluted filter element is increased in the outer peripheral portion of the convoluted filter element facilitates winding of the corrugated filter material in convolutions.

DESCRIPTION OF THE PREFERRED EMBODIMENTS

Figure 1:
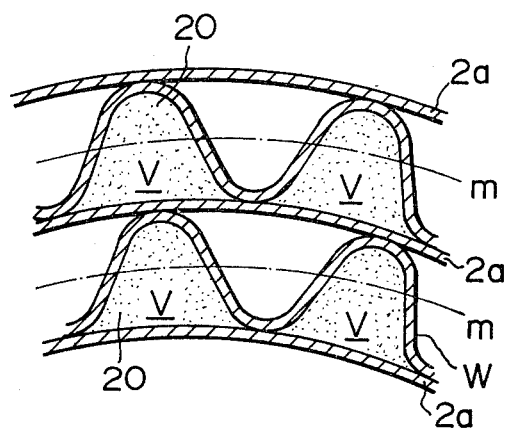
FIG. 1 is a transverse sectional view of the essential portions of a filter element of the prior art.
Figure 2:
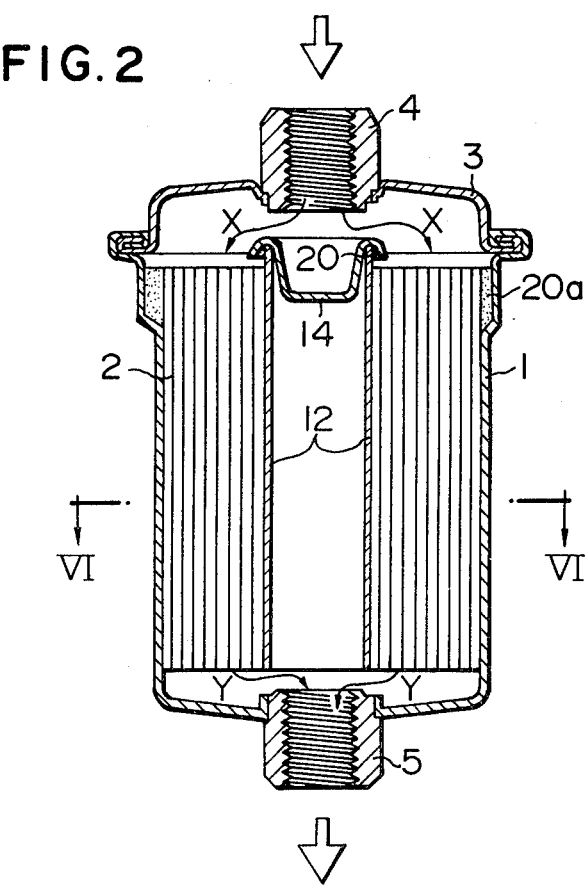
FIG. 2 is a vertical sectional view of a filter having mounted therein the filter element comprising a first embodiment of the invention.
Figure 3:
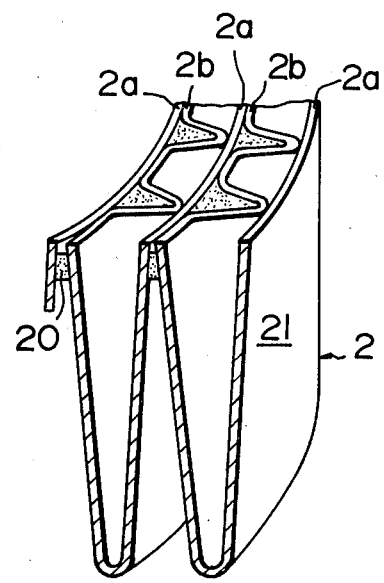
FIG. 3 is a fragmentary perspective view of the filter element shown in FIG. 2.
Figure 4:
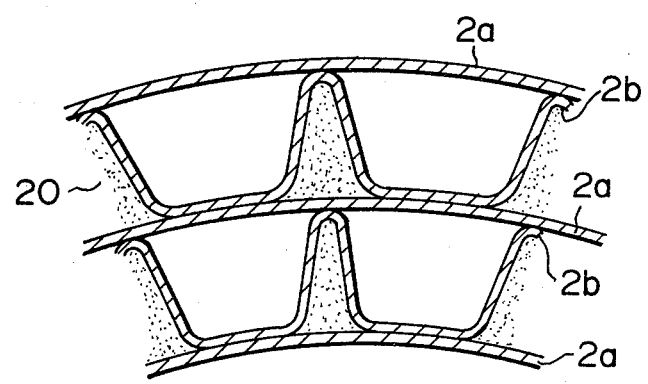
FIG. 4 is a plan view of the filter element shown in FIG. 3.
Figure 5:
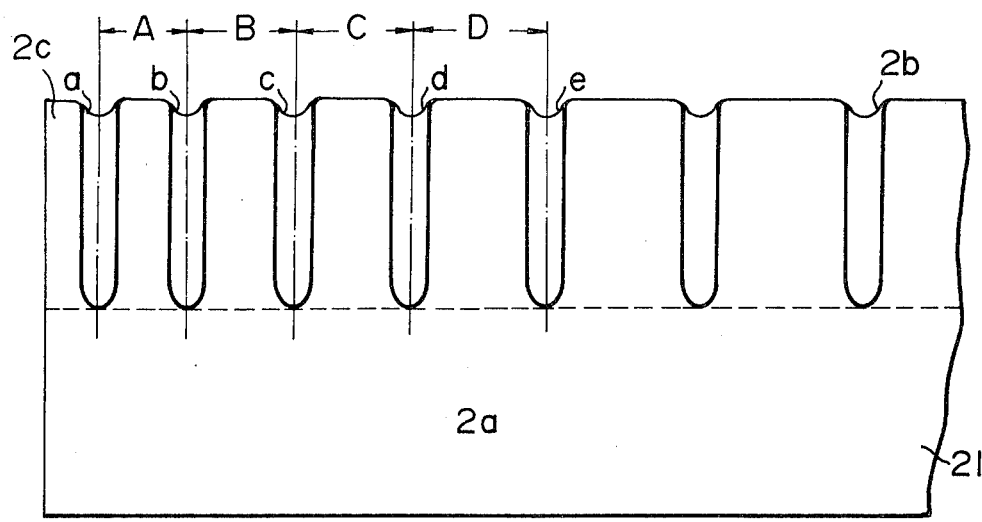
FIG. 5 is a developed view of the filter material shown in FIG. 3.
Figure 6:
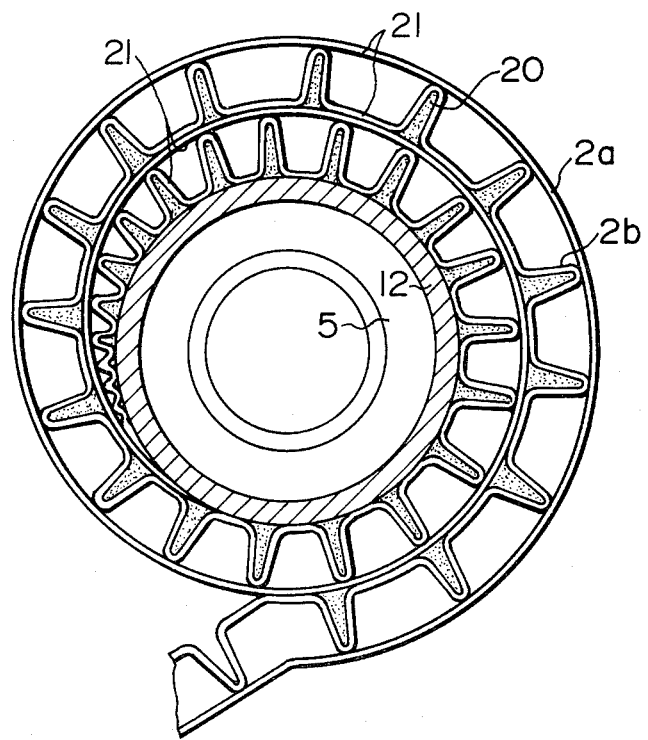
FIG. 6 is a transverse sectional view taken along the line VI—VI in FIG. 2.

A first embodiment of the invention will now be described by referring to FIGS. 2-7, wherein the numeral 1 designates a container for a filter element 2. The container is secured to an upper cover 3 by seaming to provide a unitary structure. The upper cover 3 has threaded thereto an inlet union 4 to be connected to a liquid inlet line (fuel supply line of an automotive vehicle, for example), not shown, and an outlet union 5 to be connected to a liquid outlet line, not shown, is threaded into the lower portion of the container 1. As shown in FIG. 3 the filter element 2 includes a filter material 21 folded in half on a longitudinal center in such a manner that one half portion thereof is a planar portion 2a and the other half portion thereof is a corrugated portion 2b. The filter material 21 may be filter paper. As shown in FIG. 5, an end of the filter material 21 at which winding is started is designated by 2c and elevated areas a, b, c, d and e disposed in the indicated order from left to right in the figure have pitches A, B, C and D respectively with the pitches becoming increasingly greater or $A<B<C<D$. The pitch of the elevated areas remains constant after a predetermined point is reached. In FIG. 5, the longitudinal center of the material 21 is shown by a dotted line. FIG. 6 shows the filter material 21 of the aforesaid construction in a convoluted form. While the filter material 21 is bring wound, a bonding agent 20 (such as of the epoxy base, 6-nylon base, etc.) is stuffed between the corrugated portion 2b and the planar portion 2a to bond them together, to avoid liquid leakage. The filter element 2 is convoluted which is formed by winding the filter material 21 after applying the bonding agent 20 to the starting end of the filter material 21 and bonding same to a pipe 12 serving as a core. Referring back to FIG. 2, stopper 14 is bonded by the bonding agent 20 to an end of the pipe 12 serving as a core of the filter element 2 at which the liquid flows into the filter element 2, to avoid liquid leakage. The filter element 2 in a convoluted form is bonded at its outermost convolution to the container 1 to avoid liquid leakage.

Figure 7:
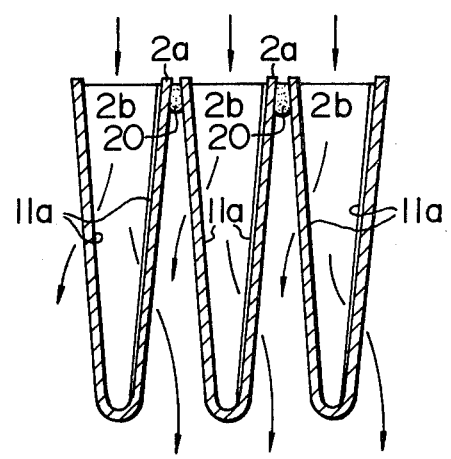
FIG. 7 is a vertical sectional view showing the flow of liquid through the filter element shown in FIG. 6.

The operation of the filter element of the aforesaid construction will now be described. A liquid is introduced from the liquid inlet line, now shown, into the filter through the inlet union 4 an flows in the filter as indicated by arrows in FIG. 2. The liquid impinges on the stopper 14 mounted on the liquid inlet end of the pipe 12 which serves as a core and flows into the filter element 2 wound in convolutions on the pipe 12. In the filter element 2 foled in half in the form of a letter V, the liquid flows through the planar portion 2a and the corrugated portion 2b from inside to outside the letter V as shown in FIG. 7, so that particles in the liquid adheres to inner sides 11a of the V-shaped corrugated portion 2b. The filtered liquid flows from the lower end of the filter element 2 into the outlet union 5 as indicated by arrows Y, to be discharged from the filter into the liquid outlet line, not shown, connected to the outlet union 5.

Figure 8:
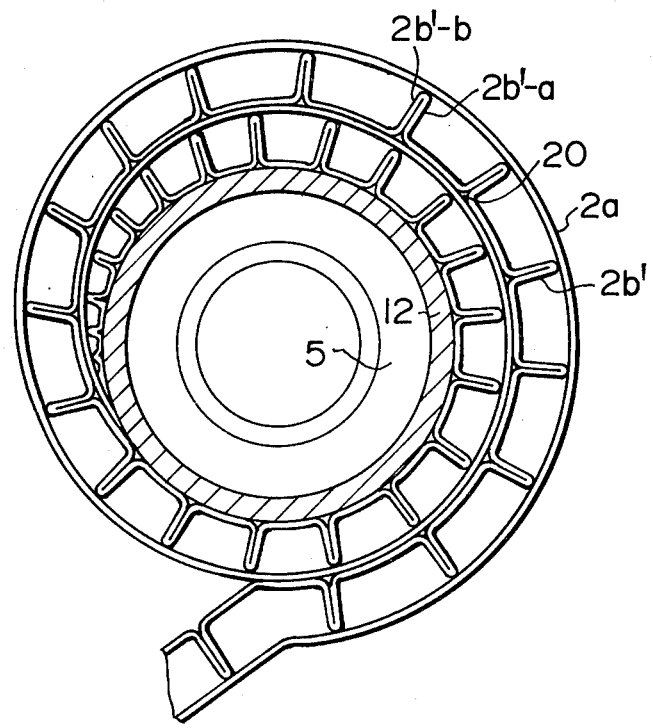
FIG. 8 is a transverse sectional view of the filter element comprising a second embodiment of the invention.

FIG. 8 shows a second embodiment of the invention which is distinct from the first embodiment in the transverse cross-sectional shape of the corrugated portion 2b of the filter element 2. The corrugated portion 2b' includes elevated areas which are not in the form of a letter V in the inverted position but each have sides 2b'-a and 2b'-b bonded to each other.

The pitch of the elevated areas is increased in the same manner as described with reference to the first embodiment as shown in FIG. 5. That is, the pitch is increased in such a manner that a pattern $A=B<C=D$ is repeated. The same result can be achieved by repeating a pattern $A=B=C<D$. Alternatively, the pitch of the elevated areas of the corrugated portion 2b may be varied successively or in a stepped fashion through the entire length of the filter material 21 from the end thereof at which winding is started to the end thereof at which winding is terminated. Also, the transverse cross-sectional form of the elevated areas of the corrugated portion 2b is not limited to the specific forms shown and described hereinabove and many changes and modifications may be made therein.

What is claimed is:

1. A filter element for straining liquid formed of a filter material, said filter material comprising two portions separated by a longitudinal center, one portion being a planar portion and the other portion being a corrugated portion including a plurality of elevated areas, said filter material being folded in half in the longitudinal center to form a series of letters V on a transverse cross-sectional surface thereof and the folded filter material being wound into a convoluted form, characterized in that the pitch of the elevated areas of the corrugated portion of the filter material wound into a convoluted form is increased from the central portion of the convoluted filter element to in the outer peripheral portion thereof.

2. A filter element as set forth in claim 1, further characterized in that the pitch of the elevated areas of the corrugated portion of the filter material is successively increased in going from one end of the filter material at which winding is started toward the other end thereof until a predetermined point is reached and the pitch becomes constant thereafter.

3. A filter element as set forth in claim 2, further characterized in that the elevated areas of the corrugated portion of the filter material each have their sides adhered to each other.

* * * * *